(12) United States Patent
Pizot et al.

(10) Patent No.: US 9,706,082 B2
(45) Date of Patent: Jul. 11, 2017

(54) AUTHENTICATION UTILIZING ENCODED DATA

(71) Applicant: HEWLETT-PACKARD DEVELOPMENT COMPANY, L.P., Houston, TX (US)

(72) Inventors: Laurent Pizot, Camas, WA (US); Jefferson P. Ward, Brush Prairie, WA (US); Rowdy K. Webb, Portland, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/780,087

(22) PCT Filed: Apr. 26, 2013

(86) PCT No.: PCT/US2013/038518
§ 371 (c)(1),
(2) Date: Sep. 25, 2015

(87) PCT Pub. No.: WO2014/175900
PCT Pub. Date: Oct. 30, 2014

(65) Prior Publication Data
US 2016/0057313 A1    Feb. 25, 2016

(51) Int. Cl.
*H04N 1/44* (2006.01)
*G06F 21/44* (2013.01)
*H04L 29/06* (2006.01)
*G06F 21/31* (2013.01)
*G06K 15/00* (2006.01)
*H04L 9/08* (2006.01)

(52) U.S. Cl.
CPC .......... *H04N 1/4433* (2013.01); *G06F 21/31* (2013.01); *G06F 21/44* (2013.01); *G06K 15/4095* (2013.01); *H04L 9/0861* (2013.01); *H04L 63/08* (2013.01); *H04N 1/4486* (2013.01); *G06F 2221/2129* (2013.01); *H04N 2201/0094* (2013.01)

(58) Field of Classification Search
None
See application file for complete search history.

(56) References Cited

U.S. PATENT DOCUMENTS

| 5,323,393 | A | 6/1994 | Barrett et al. |
| 7,315,713 | B2 | 1/2008 | Parry et al. |
| 7,450,260 | B2 * | 11/2008 | Takeda ................. G06F 21/608 358/1.14 |

(Continued)

OTHER PUBLICATIONS

David Kappos, Subject Matter Eligibility of Computer Readable Media, Feb. 23, 2010, USPTO, 1351 OG 212, p. 1 of 1.*

(Continued)

*Primary Examiner* — Ted Barnes
(74) *Attorney, Agent, or Firm* — HP Inc. Patent Department (57) ABSTRACT

A system for authenticating a user is disclosed herein. An example includes a printer and a printer states code. The example also includes a processor and a support center. Other features of the system are disclosed herein, as are an example of authentication method and a non-volatile storage medium.

13 Claims, 5 Drawing Sheets

Figure 2

(56) References Cited

U.S. PATENT DOCUMENTS

| | | | | |
|---|---|---|---|---|
| 7,685,424 B2* | 3/2010 | Walmsley | ............... | G06F 21/44 |
| | | | | 399/24 |
| 7,950,766 B2 | 5/2011 | Ejiri et al. | | |
| 2007/0005801 A1* | 1/2007 | Kumar | .................... | H04L 63/08 |
| | | | | 709/238 |
| 2007/0073628 A1* | 3/2007 | Pauly | ............... | G07B 17/00733 |
| | | | | 705/62 |
| 2009/0063860 A1* | 3/2009 | Barnett | ............... | H04L 63/0442 |
| | | | | 713/171 |
| 2009/0132682 A1* | 5/2009 | Counterman | ........... | H04L 63/08 |
| | | | | 709/220 |
| 2010/0191983 A1* | 7/2010 | Yami | .................... | G06F 21/608 |
| | | | | 713/193 |
| 2011/0122261 A1 | 5/2011 | Silverbrook | | |
| 2012/0081749 A1 | 4/2012 | Kitada | | |
| 2014/0226174 A1* | 8/2014 | Pizot | ........................ | H04L 61/10 |
| | | | | 358/1.14 |
| 2014/0380055 A1* | 12/2014 | Blanchard | ............. | H04L 9/0891 |
| | | | | 713/171 |
| 2016/0164868 A1* | 6/2016 | Cunningham | ........ | H04L 9/0877 |
| | | | | 726/7 |
| 2016/0214391 A1* | 7/2016 | Ward | ................. | G03G 15/0863 |

OTHER PUBLICATIONS

HP Access Control Secure Print Authentication, HP Large Enterprise Business, 2011, pp. 1-2, Hewlett-Packard Development Company, L.P.

International Search Report & Written Opinion for PCT Application No. PCT/US2013/038518, Jan. 23, 2014, 13 pages.

* cited by examiner

AUTHENTICATION UTILIZING ENCODED DATA

BACKGROUND

Information sometimes needs to be shared in a secure manner. This can occur in a variety of contexts including between consumers and businesses that are providing goods and/or services for sale.

BRIEF DESCRIPTION OF THE DRAWINGS

The following detailed description references the drawings, wherein.

DETAILED DESCRIPTION

Consumers and other individuals sometimes need to contact businesses and other organizations for information or assistance. Those providing support for such purposes may need to validate the identity of such consumers and individuals. They may also need to obtain information relating to things such as the status of their accounts and/or products.

In some circumstances, the authentication of such consumers or individuals can take place automatically by the support agent obtaining the necessary information directly from the product via, for example, the cloud. In such cases, device or product status may also be obtained in a similar manner. In other circumstances, however, the authentication of such consumers or individuals cannot take place automatically due to lack of network connectivity. Such lack of network connectivity also hampers the ability of a support agent to obtain information relating to the status of a device or product (e.g., the quantity or amount of printing composition and/or media that remain available for use).

Figure 1:
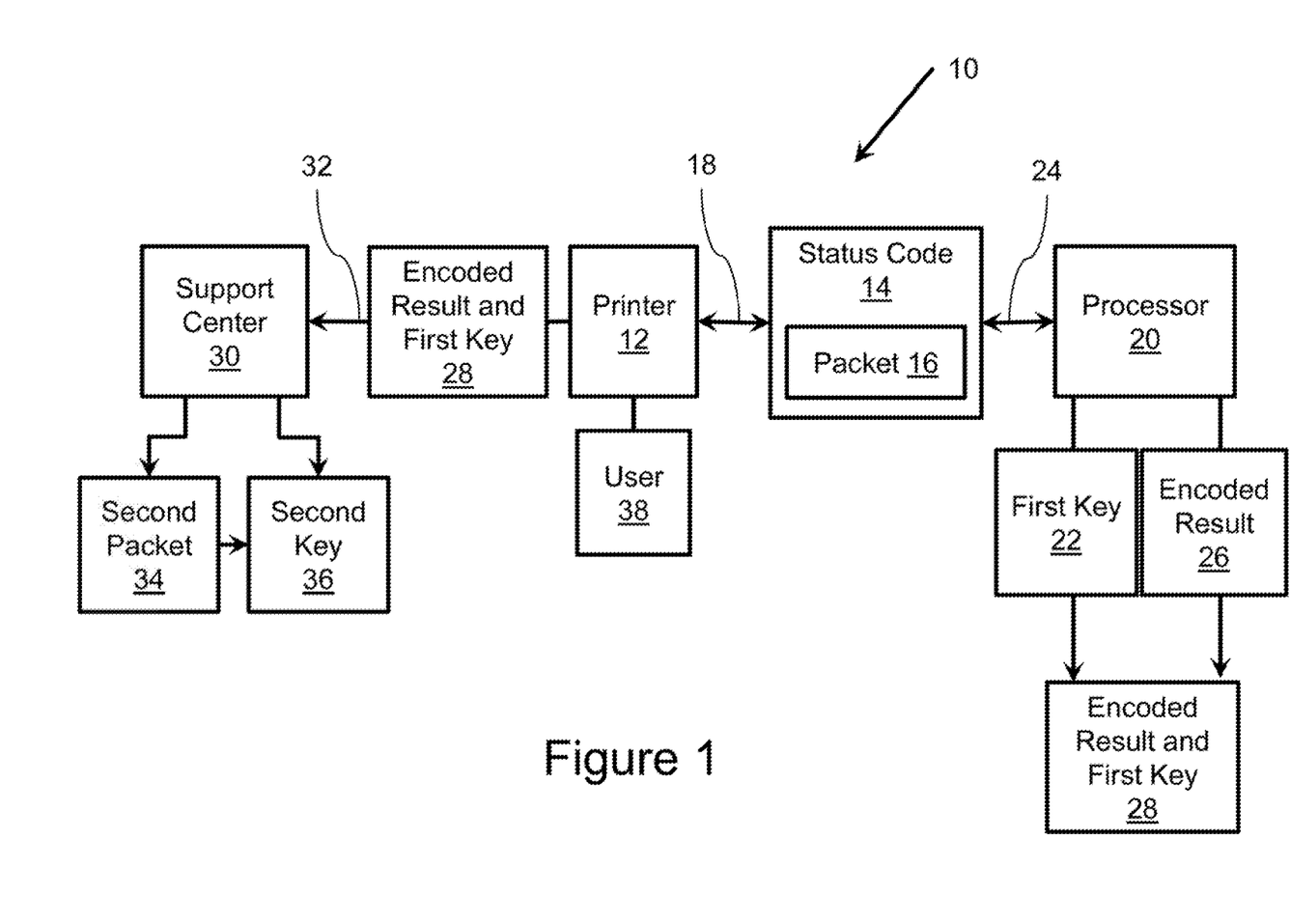
FIG. 1 is an example of a system for authenticating a user.

An example of a system 10 for authenticating a user that, is directed to addressing these challenges is illustrated in FIG. 1. As used herein, the term "cloud" is defined as including, but not necessarily limited to, computing resources (hardware, software, and firmware) that are delivered as a service over a network (such as the internet).

As used herein, the term "non-volatile storage medium" is defined as including, but not necessarily limited to, any media that can contain, store, retain, or maintain programs, code, scripts, information, and/or data. A non-volatile storage medium may include any one of many physical media such as, for example, electronic, magnetic, optical, electromagnetic, or semiconductor media. A non-volatile storage medium may be a component of a distributed system. More specific examples of suitable non-volatile storage media include, but are not limited to, a magnetic computer diskette such as floppy diskettes or hard drives, magnetic tape, a read-only memory (ROM), an erasable programmable read-only memory (EPROM), a flash drive, a compact disc (CD), a digital video disk (DVD), or a memristor.

As used herein, the term "processor" is defined as including, but not necessarily limited to, an instruction execution system such as a computer/processor based system, an Application Specific Integrated Circuit (ASIC), a computing device, or a hardware and/or software system that can fetch or obtain the logic from a non-volatile storage medium and execute the instructions contained therein, "Processor" can also include any controller, state-machine, microprocessor, cloud-based utility, service or feature, or any other analogue, digital and/or mechanical implementation thereof. A processor may be a component of a distributed system.

As used herein, the term "packet" is defined as including, but not necessarily limited to, a formatted, unit or section of data. As used herein, the terms "logical operator" and "logical operation" are defined as including, but not necessarily limited to, a function or procedure in which a quantity or quantities being operated on and the results of the operation can each have two values. Examples or logical operators and logical operations include, but are not limited to, AND, OR, NAND, XOR, and NOR.

As used herein, the term "printer" is defined as including, but not necessarily limited to, a peripheral that produces a representation of a document on one or both sides of media such as paper, transparency, fabric, etc. A printer can be single function or multi-function (e.g., including scanning, faxing, or other functionality). A printer can use any of a variety of different types of marking technologies such as laser, inkjet, dye-sublimation, off-set printing, thermal printing, impact, etc. As used herein, the term "distributed system" is defined as including, but not necessarily limited to, multiple processors and non-volatile storage media in different locations or systems that communicate via a network, such as the cloud.

Referring again to FIG. 1, system 10 includes a printer 12 and a printer status code 14 that includes a packet 16 having data regarding at least one parameter relating to an account associated with printer 12, as generally indicated by double-headed arrow 18. System 10 also includes a processor 20 that creates a first cryptographic key 22 based on data from packet 16 of printer status code 14, as generally indicated by double-headed arrow 24, performs a logical operation on data in printer status code 14 and a selected obfuscation mask to create a result 26, and encodes result 26 and first cryptographic key 22, as generally indicated by block 28.

System 10 additionally includes a support center 30 that receives the encoded result and first cryptographic key 28 via a transmission, as generally indicated by arrow 32. Support center 30 decodes received encoded result and first cryptographic key 28 and performs a second logical operation on the decoded result to create a second packet 34. Support center 30 also creates a second cryptographic key 36 based on date from second packet 34 and compares second cryptographic key 36 to first cryptographic key 22. Support center 30 utilizes data in second packet 34 to provide assistance to a user 38 of printer 12 in instances where second cryptographic key 36 is the same as first cryptographic key 22.

If respective first and second cryptographic keys 22 and 36 differ, then a possibility exists that an error occurred during transmission of encoded result and first cryptographic key 28. Support center 30 can request that user 38 retransmit encoded result and first cryptographic key 28. Support center 30 can then create a new second cryptographic key 36 and compare it with first cryptographic key 22. If the new second cryptographic key 36 and first cryptographic key 22 match, then support center 30 can utilize data in second packet 34 to provide assistance to user 38. If respective first and second cryptographic keys 22 and 36 still differ, then a possibility exists that an error occurred during retransmission of encoded result and first cryptographic key 28. Support center 30 can request that user 38 retransmit encoded result and first cryptographic key 28 again or, alternatively, terminate the attempted support engagement with user 38.

Figure 2:
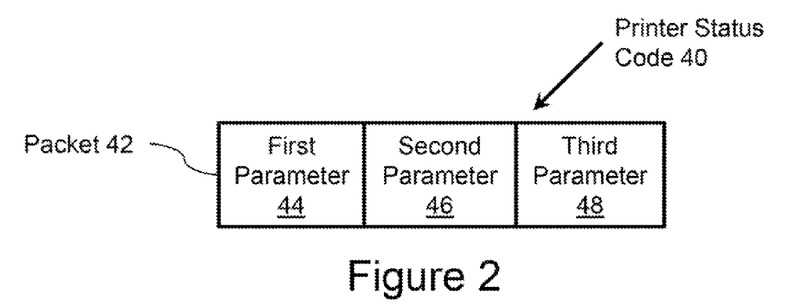
FIG. 2 is an example of a printer status code.

An example of a printer status code 40 is shown in FIG. 2. As can be seen is FIG. 2, printer status code 40 includes a packet 42 having data that includes parameters relating to an account associated with a printer, such as printer 12 shown in FIG. 1. More specifically, in this example, a first parameter 44 relating to a unique identifier, a second parameter 46 relating to a status of the account, and a third parameter 48 relating to a level of at least one printer consumable.

The unique identifier of first parameter 44 may contain information relating to the particular account number of a user, subscriber or printer. Second parameter 46 may contain data, for example, regarding whether an account is in good standing or has exceeded any limits, such as the number of printed pages for which pre-payments have been received. Third parameter 48 may contain data or information relating to one or more printer consumables such as ink level, media level, toner level, drum life, fuser level, etc.

Respective first, second, and third parameters 44, 46, and 48 may include any number of predetermined bits of data necessary to represent the required amount of information. Additionally, in other examples of printer status code 40, respective first, second, and third parameters 44, 46, and 48 may be ordered differently within packet 42 than as shown in FIG. 2. Furthermore, in other examples of printer status code 40, packet 42 may include a greater number or a fewer number of parameters than respective first, second, and third parameters 44, 46, and 48 illustrated in FIG. 2.

Printer status code 40 may be provided to user 38 of printer 12 in any of a variety of different ways. For example, it may be displayed on a user interface or visible panel of printer 12. As another example, it may be provided via printed output of printer 12. As an additional example, it may be audibly provided by printer 12 or a component attached thereto, such as a speaker of a computer. Printer status code 40 may be transmitted to support center 30 in any of a variety of different ways. For example, it may be transmitted by an email, a short message service ("SMS"), a telephone conversation, or an instant message. These various different types of transmissions provided for by authentication system 10 allow an agent of support center 30 to authenticate user 38 and obtain additional information automatically when network connectivity exists, as well as in circumstances where there is a lack of such network connectivity.

Figure 3:
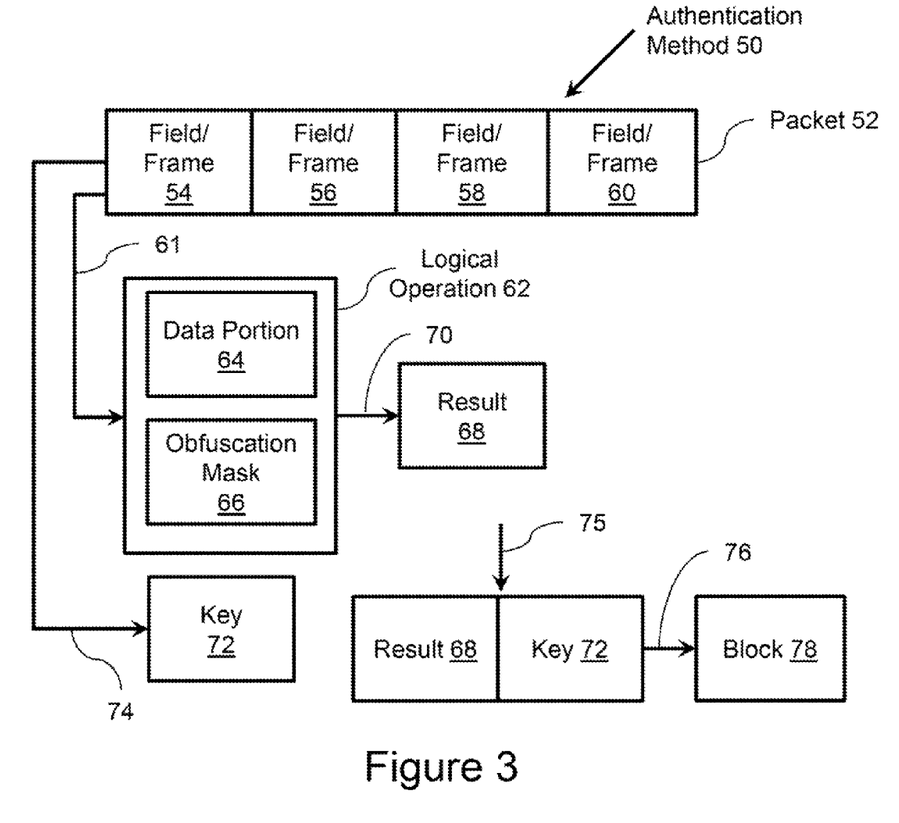
FIG. 3 is an example of an authentication method.

An example of an authentication method 50 is shown in FIG. 3. As can be seen in FIG. 3, method 50 includes populating a packet 52 with data. In this example, this data is placed in fields or frames 54, 56, and 58. Fields or frames 54, 56, and 58 may be of any predetermined size or number of bits. As can be seen in FIG. 3, packet 52 also includes field or frame 60 that includes data representing or relating to an index value that authentication method 50 utilizes to select an obfuscation mask. Frame or field 60 may include any number of predetermined bits depending on the number of different obfuscation masks that need to be represented. For example, a four (4) bit field could be used to represent sixteen (16) different obfuscation masks. As another example, a five (5) bit field could be used to represent thirty two (32) different obfuscation masks. In this example, once a particular obfuscation mask is selected, the index value located in field or frame 60 may be changed (e.g., incremented or decremented) to select a new or next obfuscation mask for subsequent use by authentication method 50.

As can be seen in FIG. 3 and generally indicated by arrow 61, authentication method 50 performs a logical operation 62 on at least a portion 64 of the data in packet 52 with the selected obfuscation mask 66 to create a result 68, as generally indicated by arrow 70. Portion 64 of the data in packet 52 is made up of one or more bite from at least one of the fields or frames 54, 56, and/or 58 of packet 52. Each of the obfuscation masks, including selected obfuscation mask 66, are designed to help randomize portion 64 of the data in packet 52. This randomization, helps to secure the configuration or layout of packet 52.

Depending on the particular fields or frames of portion 64 of packet 52, as well as the type of logical operation 62 that is utilized, certain elements of each of the obfuscation masks, including selected obfuscation mask 66, may need to have a particular value so that they remain unchanged in result 68. For example, if all of the data in frame or field 60 representing the index value used to select a particular obfuscation mask is a part of portion 64 of the data in packet 52 and logical operator 62 is an exclusive-or (XOR) function, then zeros must be present in those locations of each of the obfuscation masks, including selected obfuscation mask 66, that are exclusively-or'ed (XOR'ed) with the data in portion 64 of packet 52 representing field or frame 60.

As can also be seen in FIG. 3, authentication method 50 creates a first cryptographic key 72 based on data from packet 52, as generally indicated by arrow 74. First cryptographic key 72 may be created in a variety of different ways. In this example, first cryptographic key 72 is created utilizing a keyed-hash message authentication code ("HMAC"). More specifically, HMAC-SHA256 is performed on all or a portion of the data within fields or frames 54, 56, 58, and 60 of packet 52. The entire 256 bits or a portion thereof (e.g., 16 bits) of the result of this operation may then be utilized as first cryptographic key 72. It is to be understood, however, that in other examples, HMAC-SHA256 may be performed, on only a predetermined amount of data within all or a portion of frames 54, 56, 58, and 60. Also, it is to be understood that, in other examples, different types of HMAC may be used, such as MD5, SHA1 or SHA256.

As can additionally be seen in FIG. 3 and generally indicated by arrow 75, authentication method 50 combines result 68 and first cryptographic key 72. Authentication, method 50 then encodes combined result 68 and first cryptographic key 72, as generally indicated by arrow 76 and block 78. Combined result 68 and first cryptographic key 72 may be encoded in any of a variety of different ways. In the example illustrated in FIG. 3, combined-result 68 and first cryptographic key 72 are encoded by application of a base thirty two conversion through the use of a predetermined reference string. For example, using a predetermined reference string of s3umj5gyb6o2arxckfn94dpt7eqzw8lh, the following base thirty two conversion may be performed:

$$00000_{binary} = s_{base\ 32}$$

$$00001_{binary} = 3_{base\ 32}$$

$$00010_{binary} = u_{base\ 32}$$

$$\ldots$$

$$11111_{binary} = h_{base\ 32}$$

The above-described base thirty two reference string is case insensitive and utilizes letters [a-z], minus letters "i" (which can be mistaken for the letter "l" or the number "1") and "v" (which can be mistaken for the letters "u" and "r") and numbers "0" (which can be mistaken for the letter "o") and "1" (which can be mistaken for the letters "i" or "l"). This base thirty two reference string allows encoded combined result and first cryptographic key 78 to be more easily read by, for example, a user 38 of printer 12 (see FIG. 1). In this context, packet 52 may correspond to packet 42 of printer status code 40 (see FIG. 2), where first parameter 44 relating to a unique identifier corresponds to field or frame 54 of packet 52, second parameter 46 relating to a status of the account corresponds to field or frame 56 of packet 52, and a third parameter 48 relating to a level of at least one printer consumable corresponds to field or frame 58 of packet 52.

It should be noted that, in other examples, different base thirty two reference strings can be used which have an alternative order of the same letters and numbers, as those provided above. Alternatively, different base thirty two reference strings may be used that have one or more alternative letters (e.g., a capital "R") and/or numbers than those utilized above. It is also to be understood that, in still other examples, techniques other than base thirty two conversion (e.g., base sixty four) may be utilized to encode combined result 68 and first cryptographic key 72.

Figure 4:
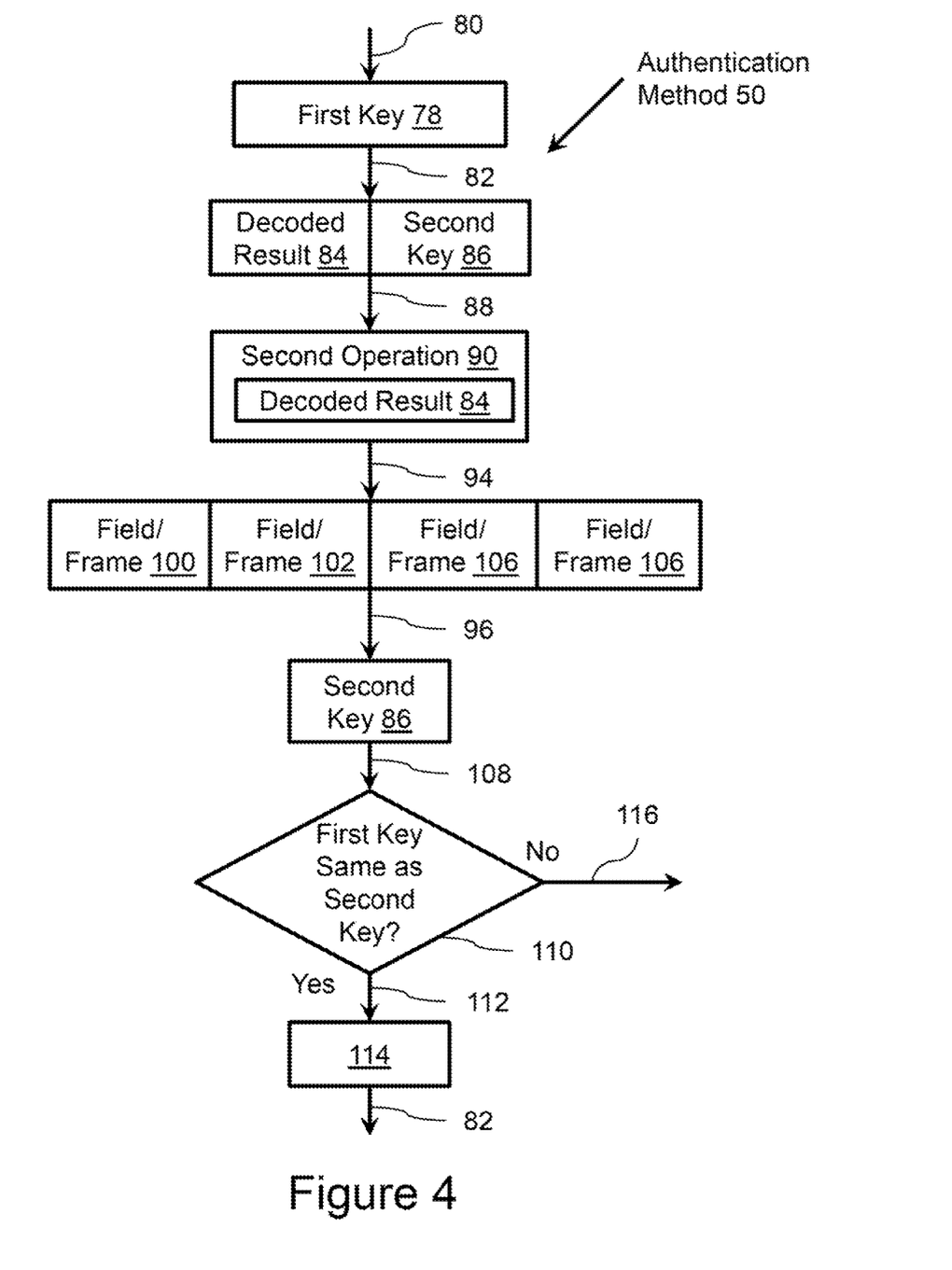
FIG. 4 is an example of additional elements of the authentication method of FIG. 3.

An example of additional elements of authentication method 50 is shown in FIG. 4. As can be seen in FIG. 4, authentication method 50 may include receiving the encoded combined result and first cryptographic key 78 via a transmission, as generally indicated by arrow 80. This transmission may occur in any of a variety of different ways including an email, a short message service ("SMS"), a telephone conversation, or an instant message. In at least one example, this transmission may be made to support center 30 by a purported valid user 38 of printer 12.

As can also be seen in FIG. 4, authentication method 50 decodes the encoded combined result and first cryptographic key 78, as generally indicated by arrow 82, to produce decoded result 84 and second cryptographic key 86. Authentication method 50 utilizes the same scheme or technique to decode the encoded, combined result and first cryptographic key 78 that should have been used during the original encoding. As discussed above in connection with FIG. 3, in this illustrated example of authentication method 50, this results in the utilization of a conversion from base thirty two to binary, through the use of a predetermined reference string.

As can additionally be seen in FIG. 4 and as generally indicated by arrow 88, authentication method 50 performs a second logical operation 90 on decoded/result 84 to obtain a second packet 92, as generally indicated by arrow 94. In at least some examples, second logical operation 90 may be the same as first logical operation 62. Authentication method 50 then creates a second cryptographic key 96 based on data from second packet 92, as generally indicated by arrow 98. Second cryptographic key 96 may be created in a variety of different ways just like first cryptographic key 72. However, second cryptographic key 96 needs to be created in the same manner as first cryptographic key 72 in order for the two to be compared, as discussed more fully below. In the example illustrated in FIG. 4, this means that second cryptographic key 96 is created utilizing HMAC-SHA256 on all or the same portion of the data within the fields or frames 100, 102, 104, and 106 of second packet 92, as described above with respect to first cryptographic key 72. Just like first cryptographic key 72, the entire 256 bits or a portion thereof (e.g., 16 bits) of the result of this operation may then be utilized as second cryptographic key 96.

As discussed above, authentication method 50 compares second cryptographic key 96 to first cryptographic key 72 to determine if they are the same, as generally indicated by arrow 108 and comparison block 110 in FIG. 4. If respective first and second cryptographic keys 72 and 96 are the same, then authentication method 50 utilizes data in second packet 92, as generally indicated by arrow 112 and block 114 in FIG. 4. In those cases, for example, where second packet 92 corresponds to packet 16 of printer status code 14 (see FIG. 1), support center 30 may utilize data in one or more of fields or frames 100, 102, 104, and 106 to provide assistance to user 38 of printer 12. If respective first and second cryptographic keys 72 and 96 are not the same, then authentication method 50 does not utilize data in second packet 92, as generally indicated by arrow 116 in FIG. 4.

Figure 5:
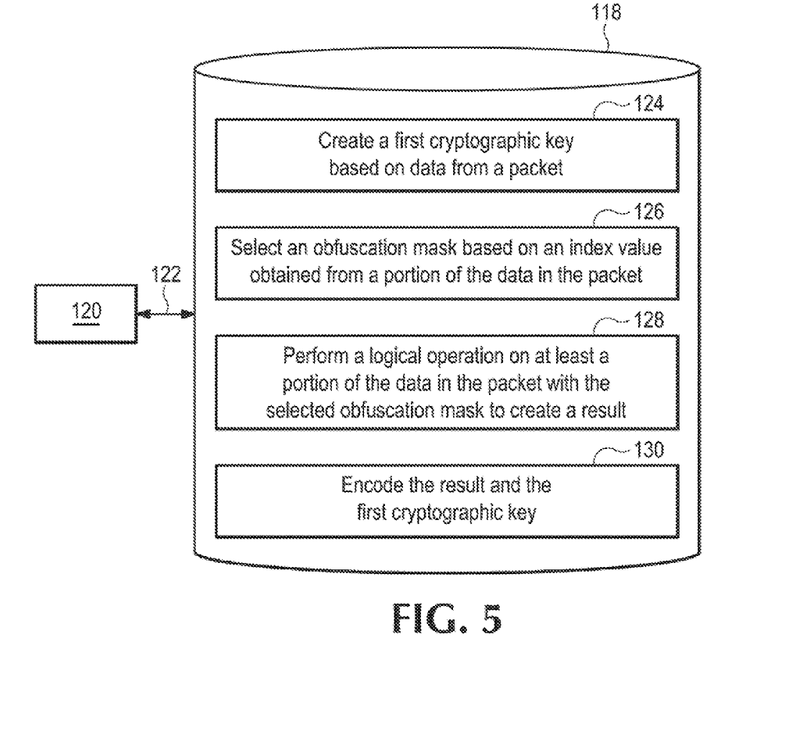
FIG. 5 is an example of non-volatile storage medium that includes instructions executable by a processor.

An example of a non-volatile storage medium 118 that includes instructions executable by a processor 120, as generally indicated by double-headed arrow 122, is shown in FIG. 5. As can be seen in FIG. 5, non-volatile storage medium 118 includes instructions that are executable by processor 120 to create a first cryptographic key based on data from a packet, as indicated by block 124, and to select an obfuscation mask based on an index value obtained from a portion of the data in the packet, as indicated by block 126. As can also be seen in FIG. 5, non-volatile storage medium 118 includes additional instructions that are executable by processor 120 to perform a logical operation on at least a portion of the data in the packet with the selected obfuscation mask to create a result, as indicated by block 128, and to encode the result and the cryptographic key, as indicated by block 130.

The encoded result and first cryptographic key may be generated by a printer for authentication purposes, such as printer 12 of FIG. 1. Alternatively or additionally, non-volatile storage medium 118 and processor 120 may be components of a distributed system like that, for example, of FIG. 1 that includes a printer 12 and support center 30.

Figure 6:
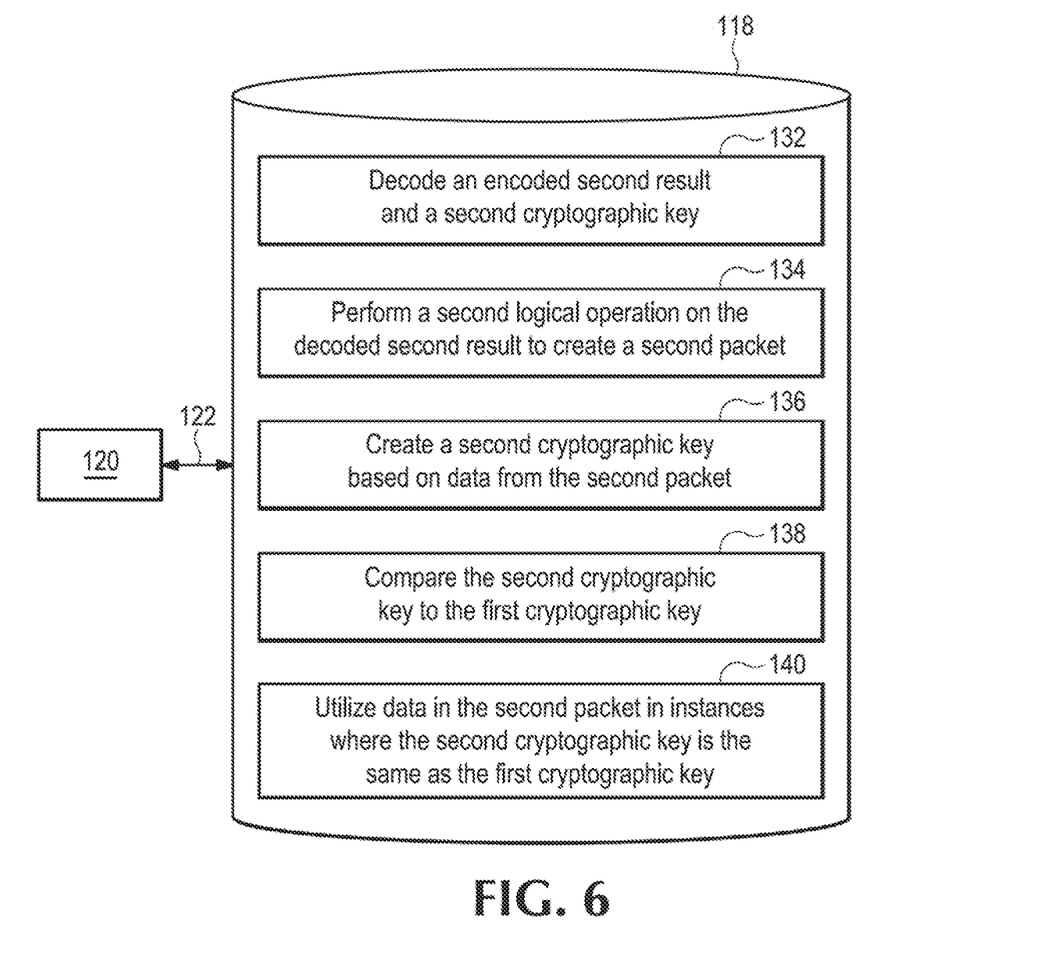
FIG. 6 is an example of additional instructions included on the non-volatile storage medium of FIG. 5 that are executable by a processor.

An example of additional instructions that may be included on non-volatile storage medium 118 that are executable by processor 120, as generally indicated by double-headed arrow 122, is shown in FIG. 6. As can be seen in FIG. 6, non-volatile storage medium 118 may include instructions that are executable by processor 120 to decode an encoded second result and a second cryptographic key, as indicated by block 132, and perform a second logical operation on the decoded second result to create a second packet, as indicated by block 134. As can also be seen in FIG. 6, non-volatile storage medium 118 may include instructions that are executable by processor 120 to create a second cryptographic key based on data from the second packet, as indicated by block 136, and to compare the second cryptographic key to the first cryptographic key, as indicated by block 138. As can further be seen in FIG. 6, non-volatile storage medium 118 may include further instructions that are executable by processor 120 to utilize data in the second packet in instances where the second cryptographic key is the same as the first cryptographic key, as indicated by block 140.

Although several drawings have been described and illustrated in detail, it is to be understood that the same are intended by way of illustration and example only. These examples are not intended to be exhaustive or to be limited to the precise form disclosed. Modifications and variations may well be apparent to those of ordinary skill in the art.

Additionally, reference to an element in the singular is not intended to mean one and only one, unless explicitly so stated, but rather means one or more. Moreover, no element or component is intended to be dedicated to the public regardless of whether the element or component is explicitly recited in the following claims.

What is claimed is:

1. A system, comprising:
   a printer, comprising:
   a printer status code that includes a packet having data regarding at least one parameter relating to an account associated with the printer; and
   a processor that creates a first cryptographic key based on data from the packet of the printer status code, performs a logical operation on data in the printer status code and a selected obfuscation mask to create a result, encodes the result and the first cryptographic key, and transmits over a network, the encoded result and first cryptographic key to a support center,
   where the support center receives the encoded result and first cryptographic key, decodes the received encoded result and first cryptographic key, performs a second logical operation on the decoded result to create a second packet, creates a second cryptographic key based on data from the second packet, compares the second cryptographic key to the first cryptographic key; and utilizes data in the second packet to authenticate the user to provide assistance to a user of the printer in instances where the second cryptographic key is the same as the first cryptographic key.

2. The system of claim 1, wherein the transmission includes one of an email, a short message service a telephonic conversation, and an instant message.

3. The system of claim 1, wherein the printer status code includes a first parameter relating to a unique identifier for the account, a second parameter relating to a status of the account, and a third parameter relating to a level of at least one printer consumable.

4. The system of claim 1, wherein the cryptographic key is created utilizing a keyed-hash message authentication code.

5. The system of claim 1, wherein the logical operation performed on data in the printer status code and the selected obfuscation mask to create the result includes an exclusive-or function.

6. The system of claim 1, wherein the result and the cryptographic key are encoded by application of a base thirty two conversion.

7. An authentication method, comprising:
   populating, by a printer, a packet with data;
   creating a first cryptographic key based on the data from the populated packet;
   selecting an obfuscation mask based on an index value obtained from a portion of the data in the packet;
   performing a logical operation on at least a portion of the data in the packet with the selected obfuscation mask to create a result;
   combining the result and the first cryptographic key;
   encoding the combined result and the first cryptographic key; and
   transmitting over a network, the combined result and the first cryptographic key to a support center to allow the support center to authenticate a user of the printer.

8. The authentication method of claim 7, where the support center authenticates the user by:
   receiving the encoded combined result and the first cryptographic key via a transmission;
   decoding the encoded combined result and the first cryptographic key;
   performing a second logical operation on the decoded result to obtain a second packet;
   creating a second cryptographic key based on data from the second packet;
   comparing the second cryptographic key to the first cryptographic key; and
   utilizing data in the second packet in instances where the second cryptographic key is the same as the first cryptographic key.

9. The authentication method of claim 8, wherein the second logical operation is the same as the first logical operation.

10. The authentication method of claim 7, wherein the encoded combined result and cryptographic key are transmitted via one of an email, a short message service, telephonically, and an instant message.

11. The authentication method of claim 7, wherein the packet includes a printer status code.

12. A non-transitory storage medium including instructions that, when executed by a processor, cause the processor to:
   create, by a printer, a first cryptographic key based on data from a packet;
   select an obfuscation mask based on an index value obtained from a portion of the data in the packet;
   perform a logical operation on at least a portion of the data in the packet with the selected obfuscation mask to create a result;
   encode the result and the first cryptographic key; and
   transmit the result and the first cryptographic key over a network to a support center to authenticate a user of the printer.

13. The non-transitory storage medium of claim 12, where receiving the result and the first cryptographic key controls the support center to:
   decode an encoded second result and a second cryptographic key;
   perform a second logical operation on the decoded second result to create a second packet;
   create a second cryptographic key based on data from the second packet;
   compare the second cryptographic key to the first cryptographic key; and
   utilize data in the second packet in instances where the second cryptographic key is the same as the first cryptographic key.

* * * * *

UNITED STATES PATENT AND TRADEMARK OFFICE
CERTIFICATE OF CORRECTION

PATENT NO. : 9,706,082 B2  
APPLICATION NO. : 14/780087  
DATED : July 11, 2017  
INVENTOR(S) : Laurent Pizot et al.

Page 1 of 1

It is certified that error appears in the above-identified patent and that said Letters Patent is hereby corrected as shown below:

In Column 7, Line 32, in Claim 2, delete "service" and insert -- service, --, therefor.

In Column 8, Line 3, in Claim 7, delete "transmitting" and insert -- transmitting, --, therefor.

Signed and Sealed this  
Twenty-eighth Day of November, 2017

Joseph Matal  
*Performing the Functions and Duties of the*  
*Under Secretary of Commerce for Intellectual Property and*  
*Director of the United States Patent and Trademark Office*